Patented Oct. 21, 1941

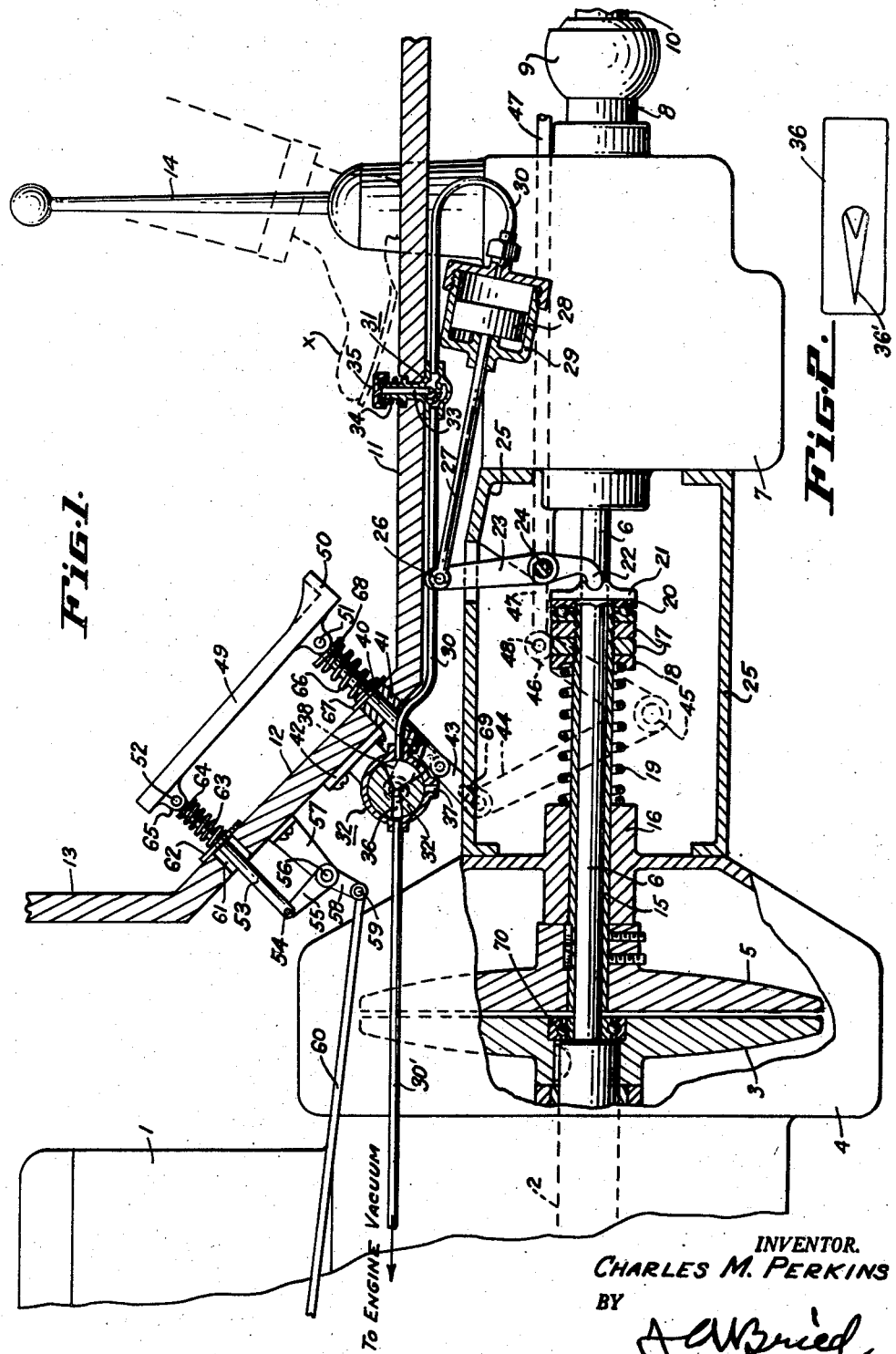

2,259,774

UNITED STATES PATENT OFFICE 2,259,774

AUTOMOBILE CONTROL MECHANISM

Charles M. Perkins, Albion, Ill.

Application May 17, 1941, Serial No. 393,995

6 Claims. (Cl. 192—.01)

This invention relates to automobiles and has for its object an improved arrangement of the controlling elements of an automobile, which includes the throttle, brake and clutch control, and which will be simpler to operate and substantially dispense with the necessity of gear shifting.

Particular advantages and features of the invention will appear in the following description and in the accompanying drawing.

In the drawing:

Fig. 1: The view is an elevation partly in section taken through the floor board of an automobile, and showing the various control elements in their preferred arrangement. Some of the elements are shown in section and others in full elevation, while others are dotted, so that all of the elements and their cooperating arrangement may be depicted in one illustration, though it should be understood that the arrangement as well as the type of control elements, such for instance whether the brakes are mechanical or hydraulic, or the clutch is of a particular type, or the air valves used, may be varied within the spirit and purpose of the invention as set out in the following description. Fig. 2 is a detail of the valve port.

In the drawing, 1 indicates an internal explosive engine of the automobile, 2 the rear portion of the engine crankshaft, 3 a clutch element secured to the engine shaft and operating in a housing 4, 5 indicates the driven half of the clutch element, 6 is the driven shaft extending to the conventional gear transmission enclosed in the transmission gear case 7. 8 indicates the output shaft from the gear housing and 9 the usual universal joint at the forward end of the propeller shaft 10 which extends to the rear wheel differential not shown.

11 is the floor of the car, 12 the upwardly slanted portion through which the foot controls usually project, and 13 is the front vertical wall of the driver's compartment under the dash. 14 is a conventional gear shift lever extending into the gear transmission box, though it is only shown for the purpose of illustrating a gear shift per se, as it is to be understood that this gear shift lever may be of any type, either extending from the floor of the car, as indicated, or of the type commonly placed on the steering wheel, or in fact even an electrical or vacuum manually controlled gear shift, as the type of gear shift, as long as it is subject to manual control, is a thing apart from the invention proper claimed in the present case.

Before describing the remaining elements of the controls, it may be said that the principal object is to provide an automobile with a type of clutch which may slip to any required degree under load without injury (and which type of clutch may include the so-called liquid transmission or "drive" now used on some cars, and in which a ribbed disk revolved by the engine in a container of liquid imparts motion to a similarly driven disk connected to the driven or propeller shaft), and which slip type of clutch may be operated or be brought into and out of engagement, by a simple foot control, and which together with the throttle and the brake will all be generally under the control of one foot of the driver, and in the act of applying or releasing the brake it will automatically release and apply the clutch in a progressive manner, so as to get the car started under normal conditions without the use of the gear shift lever at all.

Also under certain conditions of driving the clutch will automatically slip to a certain extent, or more than the normal slight slipping of the usual liquid transmission or drive type of clutch. Other features of operation of the special hookup will be understood as the description proceeds.

With further reference to the drawing, the clutch elements 3 and 5 operating within an oil housing 4, may be relatively separated from one another to make the clutch or liquid drive more or less effective depending on the separation of the members, yet if the clutch elements be merely friction clutch members, preferably operating in oil and capable of slipping without material injury in carrying the load, they may be brought more or less tightly in contact, though preferably still able to slip slightly, particularly if the pressure upon them is relieved somewhat as provided for in the construction to follow.

Clutch element 5 is here indicated as being securely mounted on a hollow shaft 15 which in turn is slidably mounted upon a solid shaft 6. Shaft 15 projects through bearing 16 and has a pair of adjusting nuts 17 threaded over it adjacent its outer end, and against the inner nut is a washer 18 and reacting between which washer and the end of bearing 16 is a compression spiral spring 19, normally tending to separate clutch or liquid drive member 5 from its confronting member 3 to make the clutch or liquid drive inoperative.

Against the outer nut 17 is a ball thrust collar 20 against the outer side of which is a washer or pressure collar 21, and bearing against which is the short end 22 of a lever 23 pivoted at 24 to a fixed point on the structure, preferably on the housing 25 which encloses the shaft and parts just described, and forms a connection between the oil housing 4 for the clutch and the housing 7 for the gear transmission. This lever 23 is pivotally connected at its outer end at 26 to a piston rod 27 which carries at its other end a piston 28 operating in a vacuum power cylinder 29, in turn connected at its opposite end by a pipe 30 which extends to the engine by way of a valve 31, valve 32 and a continuing pipe or tube 30' to the vacuum or intake manifold (not shown) of the engine 1.

The inner end of solid shaft 6 preferably projects through clutch member 5 and is supported in a ball bearing 70 mounted in the inner face of clutch member 3 so as to centralize it.

The power cylinder 29 is securely mounted to any rigid part of the vehicle or to the upper portion of the transmission housing 7. Valve 31 is preferably a needle valve or other valve which may progressively control the flow of air through pipe 30, and is in the present instance shown as having a conically pointed valve rod 33 normally urged to open position as by a spring 34, and which is movable toward closed position by downward pressing of a knob 35 at the upper end of the valve stem, as through the pressure of the toe X of the foot of a driver of the car as indicated.

Valve 32 is here shown as a circular or rotating plug type valve, but this is for illustrative purposes only as it is simpler to show the required action than it would be with any other type of valve which may be substituted for it.

This valve 32 is rigidly mounted below the slanted part of the floor board 12 as indicated and connected at opposite sides to pipes 30 and 30', and the rotatable portion 32' of the valve is ported as indicated at 36 so that in the position shown it is fully open to pipe 30' and also fully open to pipe 30 while the vent port 37 of the valve is closed by the plug. The valve is provided at its far end with an outwardly extending operating lever 38 slotted at its outer end as indicated to receive the operating pin 39 of a longitudinally movable rod 40, slidably mounted in a bushing or bearing 41, preferably formed integral with the base 42 of valve 32, and which bearing 41 extends into the floor board with the rod 40 passing to both sides of the board and with its lower end pivotally linked as at 43 to the upper end of a lever or bell crank 44 in turn pivoted to a fixed point 45, preferably to the far side of housing 25, and to the smaller end 46 of which bell crank a suitable brake operating rod 47 is pivotally connected as at 48. This brake operating rod 47 is illustrative of any rod or link or device which upon being moved will apply the brake and upon opposite direction of movement will release the brake. It is immaterial whether these brakes be merely mechanical, or hydraulic, or vacuum operated, or operated by any other force, insofar as the present invention is concerned. Therefore any further details of the manner in which rod 47 operates the brake are not shown.

At the upper end of slidable rod 40 is a foot treadle 49 preferably formed with a heel rest 50, and which foot treadle is pivotally secured at 51 adjacent the heel portion of the treadle, and at the upper or toe end it is similarly pivoted as at 52 to the upper end of a rod 53 which is in turn pivoted at its lower end as at 54 to one arm 55 of a bell crank in turn pivoted at 56 to a rigid bracket 57 secured to any suitable support such as to the floor board 12 as indicated, and to the other end 58 of the bell crank is pivotally secured at 59 the inner end of a throttle operating rod 60 which extends to the throttle of the carburetor not shown. Rod 53 passes freely through a relatively large opening 61 in the floor board so as to accommodate its oscillatory motion when depressed by the toe, and to substantially seal the upper end of this opening a washer 62 is provided, and above which washer is a compression spring 63 reacting between the washer and an outer washer 64 on rod 53, and which outer washer bears against the under side of the treadle pivot lugs 65 so as to resiliently urge the toe end of the treadle outward by the spring.

The heel end of the treadle 49 is similarly urged outward by a coiled compression spring 66 also reacting between a pair of washers 67 and 68. Spring 66 however is preferably of greater resistance than spring 63 so that the upper or throttle operating end of the treadle may be freely moved up and down by using pivot 51 as a fulcrum without necessarily compressing spring 66 or moving the heel end of the throttle down.

Reversely, it may be stated that when desired the toe may be slacked off so as not to put any pressure on the toe end of the treadle, and by pushing down with the heel only the lower end of the treadle and rod 40 will be moved down, with the treadle 49 swinging on pivot 52, without necessarily affecting the throttle.

When the heel portion of the treadle is depressed, pin 39 will operate valve 36 and the port opening in the valve is proportioned and angularly disposed with relation to the movement of the rod 40 to produce the following result:

From the position of the treadle as shown there is a clear opening to the intake manifold of the engine through pipe 30, valve 32, valve 31, pipe 30, to power cylinder 29. Thus if the ignition were turned on and the engine started in the usual manner by the starter, not shown, the air would be drawn from the power cylinder 29 and the resulting vacuum would operate the piston rod 27, and lever 23, and overcome the force of spring 19 to thereby slide friction clutch member 4 longitudinally to take up into engagement with the now revolving friction clutch member 3 which is secured to the engine shaft, and thus start the car.

It is manifest that if the clutch elements 3 and 5 were of the liquid drive or transmission type, or other clutch means capable of slipping without injury, the car would start providing any of the gears controlled by gear shift lever 14 were in mesh. If the car were in a level country the engagement could be left in high or direct drive and the car would be picked up and put into motion. The speed of the car of course would then be controlled by depressing the toe end of the treadle 49 controlling the throttle in the normal way. When the driver wished to stop the car, he would permit the toe end of the treadle to rise by lifting his toe slightly from it and at the same time depressing the heel and pushing rod 40 downward, and in doing this pin 39 would start revolving valve 32' to move port 36 away from alignment with the opening of pipe 30' and thereby shut off the vacuum connection to the engine. Immediately after this the wider or funnel shaped portion of the port 36' would open the vent 37 for air to rush in and break the vacuum in the power cylinder 29. This would immediately release the clutch under energy supplied by spring 19, and almost at the same time a further downward movement of the heel end of the treadle 39 and rod 40 would take up the lost motion slot 69 at its pivotal connection with bell crank 44, and at once apply the brakes.

As valve ports 36 and 36' are taper shaped so that as the valve is turned to bring them toward the opening of pipe 30' and exhaust opening 37 respectively, the exhausting of the power cylinder 29, or the venting of it to atmosphere through port 37, may be carried out gradually by slow movement of the heel portion of the treadle, so that the clutch may be gradually applied to pick up the work imposed in starting the car and may slip to any desired degree, as this is under the control of the foot treadle.

Besides this, under certain conditions of travel where the engine is laboring and the vacuum is impaired to a certain extent, it will lower the vacuum in the work chamber and thereby slack off slightly on the clutch to permit slightly increased slipping, and so that the engine may gain speed again without the danger of stalling, and as soon as it has recovered its vacuum the clutch will again be applied with greater force.

Also under certain conditions of travel where it is desirable to entirely prevent any slipping of the clutch by such reduction in vacuum, the driver's left foot may be used to depress button 35 to thereby seal the vacuum in the work chamber 29 so that it will continuously hold the clutch engaged with full force.

In Fig. 2 of the drawing the form of the opening edge of valve port 36' is indicated. The other port opening 36 is preferably shaped similarly.

It is manifest from what has been said, taken in the light of the known action of liquid transmissions or slipping clutches, that there is a limit to the ability of a motor to start a car under the conditions named, particularly if the load is extremely heavy or the grade is severe. For this reason I may provide the usual gear transmission indicated at 7 and which may have any suitable control handle as at 14 for interposing lower gears between the shaft 6 and the propeller shaft 10 in the usual manner. However, the use of the gear transmission will be very much reduced and may not be necessary at all in level places.

From what has been said it is evident that various modifications may be made within the spirit of the invention and which are so obvious as not to require further illustration. As an example, the springs 63 and 66 are for the purpose of forcing the upper and lower ends of the foot treadle outward, and it is manifest that instead of being positioned where shown, spring 63 may be at any point between the toe end of the treadle and the throttle valve which it controls, as it is immaterial on what part of the linkage it is placed in order to move the linkage for normally moving the throttle to idling position, and thereby forcing the toe end of the treadle outward. The same holds good for spring 66 which is for the purpose of moving the rod 40 outward, and manifestly it may be placed under the floor board as well as on top, and besides the springs may be any type of springs suitable for the purpose.

With regard to valve 32, this is merely shown as a rotary valve for simplicity, but manifestly any arrangement of valves which will open and close the ports in the manner set out may be used.

Also to be noted is that in regard to the vacuum power chamber 19, here shown as a cylinder with a piston, it is obvious that it may consist of a simple large diaphragm chamber with the piston rod connected to the diaphragm as is commonly used for brake operation instead of a piston and cylinder as shown.

In my appended claims, the use of the word "clutch" is intended to embrace the so-called fluid transmission or liquid clutch which may slip more or less under load.

Having thus described my invention and one detailed manner of carrying it out, what I claim is:

1. In control mechanism for an internal combustion engine driven automobile, the improvement which comprises providing a normally released clutch, a vacuum power chamber arranged when exhausted to engage the clutch, a pipe extending from said power chamber to the intake manifold of the engine for exhausting said chamber and applying the clutch, valve means arranged for closing off said pipe in its extension to the engine, and for venting the chamber vacuum to atmosphere, a foot operated brake pedal, and means for operating said valve means in the order above set out and immediately thereafter operating the brake as the pedal is depressed, and means normally returning the pedal to starting position.

2. In control mechanism for an internal combustion engine driven automobile, the improvement which comprises providing a normally released clutch, a vacuum power chamber arranged when exhausted to engage the clutch, a pipe extending from said power chamber to the intake manifold of the engine for exhausting said chamber and applying the clutch, valve means arranged for closing off said pipe in its extension to the engine, and for venting the chamber vacuum to atmosphere, a foot operated brake pedal, and means for operating said valve means in the order above set out and immediately thereafter operating the brake as the pedal is depressed, and means normally returning the pedal to starting position, the valve means arranged with ports adapted to be gradually opened as the pedal is moved.

3. In control mechanism for an internal combustion engine driven automobile, the improvement which comprises providing a normally released clutch, a vacuum power chamber arranged when exhausted to engage the clutch, a pipe extending from said power chamber to the intake manifold of the engine for exhausting said chamber and applying the clutch, valve means arranged for closing off said pipe in its extension to the engine, and for venting the chamber vacuum to atmosphere, a foot operated brake pedal, and means for operating said valve means in the order above set out and immediately thereafter operating the brake as the pedal is depressed, and means normally returning the pedal to starting position, and a separate normally spring opened valve on said pipe arranged for manual operation to close said pipe.

4. In control mechanism for an internal combustion engine driven automobile, the improvement which comprises providing a normally released clutch, a vacuum power chamber arranged when exhausted to engage the clutch, a pipe extending from said power chamber to the intake manifold of the engine for exhausting said chamber and applying the clutch, valve means arranged for closing off said pipe in its extension to the engine, and for venting the chamber vacuum to atmosphere, a foot operated brake pedal, and means for operating said valve means in the order above set out and immediately thereafter operating the brake as the pedal is depressed, and means normally returning the pedal to starting position, and a separate normally spring opened valve on said pipe arranged for manual operation to close said pipe positioned between said valve means and said power chamber.

5. In control mechanism for an internal combustion engine driven automobile, the improvement which comprises providing a normally spring released clutch of the type adapted for slipping, a vacuum power chamber normally open to the engine vacuum source arranged for overcoming the clutch releasing spring and engaging the clutch, a combined throttle and brake pedal arranged to open the throttle upon depressing the toe of the operating foot, and to apply the brake upon depressing the heel of the same operating foot, spring means normally urging said combined throttle and brake pedal outward to close throttle to idling speed and to release the brake, and valve means arranged for operation by depressing the heel of said operating foot for first closing off said power chamber from said source of vacuum and second bleeding the power chamber to atmosphere and third operating said brake, and vice versa as the heel portion of the pedal is released.

6. In a structure as set out in claim 5, said pedal being elongated and pivotally connected at the toe and heel ends respectively with the throttle and brake, and arranged for independent or simultaneous operation of both ends.

CHARLES M. PERKINS.